May 7, 1929.   W. E. WILLIAMS   1,711,628
STEEL SPOKE WHEEL
Filed April 29, 1926   2 Sheets-Sheet 1
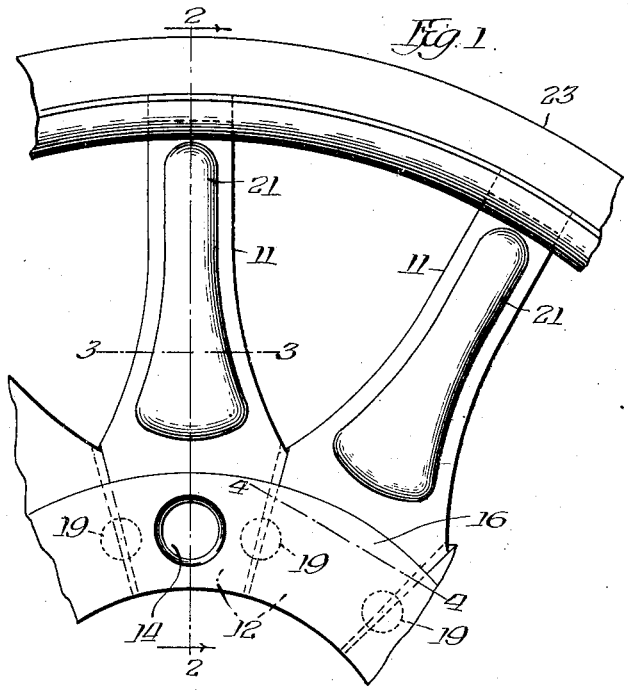
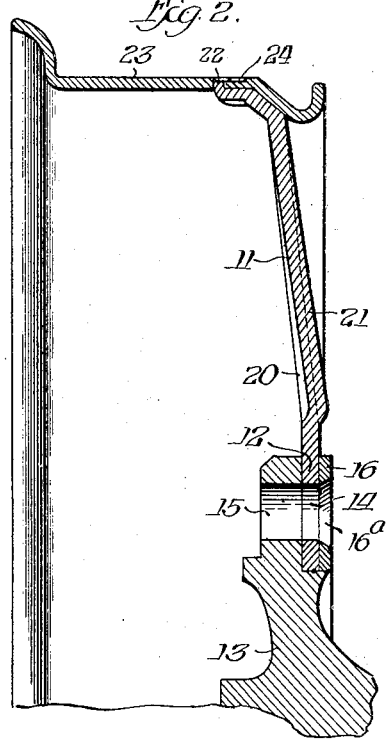
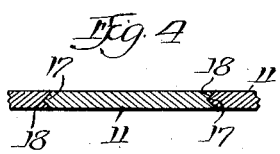
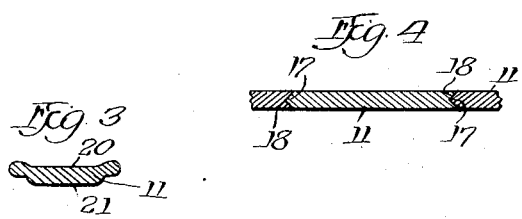
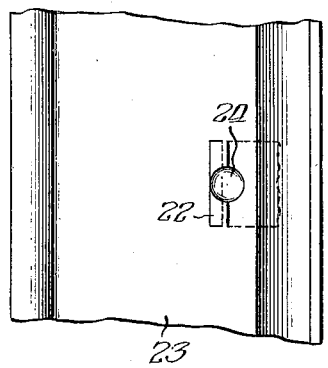
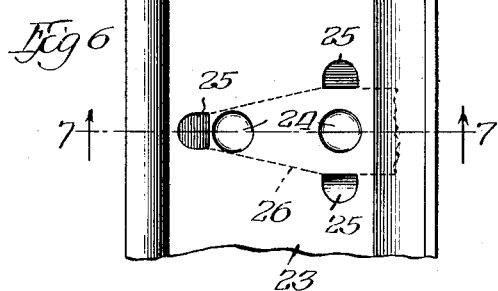
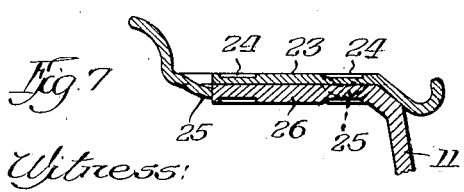
Inventor:
William Erastus Williams
By Cromwell, Greist & Warden
Attys May 7, 1929.  W. E. WILLIAMS  1,711,628
STEEL SPOKE WHEEL
Filed April 29, 1926  2 Sheets-Sheet 2
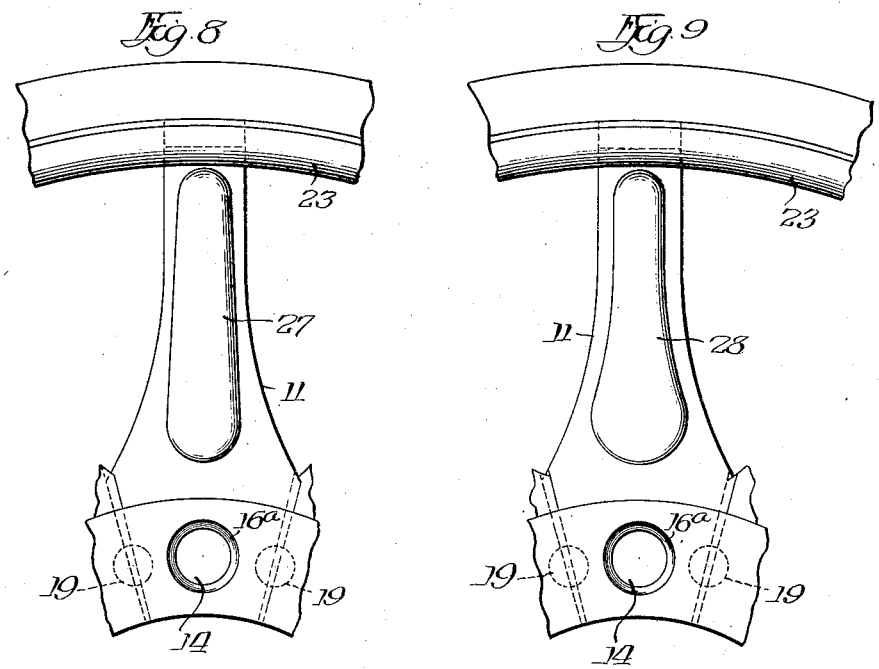
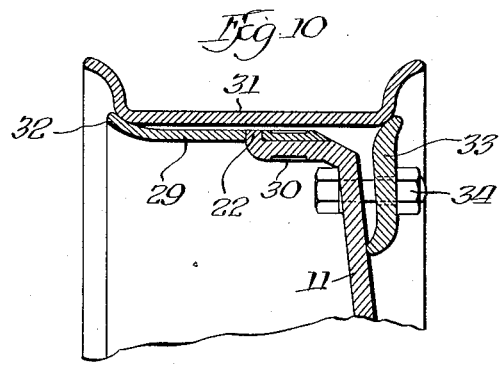
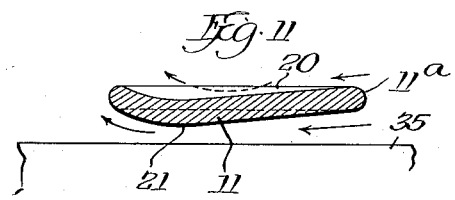
Inventor:
William Erastus Williams
By Cromwell, Greist & Warden
Attys Patented May 7, 1929.

1,711,628

UNITED STATES PATENT OFFICE.

WILLIAM ERASTUS WILLIAMS, OF CHICAGO, ILLINOIS, ASSIGNOR, BY MESNE ASSIGNMENTS, TO STEEL WHEEL CORPORATION, OF LANSING, MICHIGAN, A CORPORATION OF MICHIGAN.

STEEL-SPOKE WHEEL.

Application filed April 29, 1926. Serial No. 105,379.

My invention relates to vehicle wheels fabricated from metal and has particular regard to wheels having a body portion formed of steel spokes rather than a metal disk. The invention specifically has to do with the contour of the spokes, the manner of assembly in the hub zone to form the wheel spider and the connection with a fixed rim or a felly for taking a demountable rim.

In order that the invention may readily be understood preferred and modified embodiments of the same are set forth in the accompanying drawing by way of example; it being understood that the drawing and description are to be taken in an illustrative rather than an unnecessarily limiting sense.

In the drawing:

Fig. 1 is a fragmentary front elevation of the wheel spider;

Fig. 2 is a vertical section on the line 2—2 of Fig. 1;

Fig. 3 is a cross section on the line 3—3 of Fig. 1;

Fig. 4 is a cross section on the line 4—4 of Fig. 1;

Fig. 5 is a fragmentary plan view of Fig. 2;

Fig. 6 is a plan view showing a modified connection between the spoke end and fixed rim;

Fig. 7 is a transverse section on the line 7—7 of Fig. 6;

Fig. 8 is a fragmentary front view showing a modified spoke contour;

Fig. 9 is a view similar to Fig. 8 but showing a further modification of spoke contour.

Fig. 10 is a fragmentary radial section showing the adaptation of the wheel to a demountable rim; and Fig. 11 is a cross section of a spoke showing a further modified contour.

Having particular reference to Figs. 1 to 5 inclusive of the drawing, the spokes 11 are assembled with their segmental inner ends or heads 12 juxtaposed about a central opening for receiving the hub 13, certain of the spoke heads being provided with apertures 14 for register with corresponding apertures 15 of the hub and 16ª of the clamping ring 16, these apertures being adapted to receive the usual securing studs or bolts, not shown. The adjacent edges of the spoke heads are provided with cooperating tongues 17 and grooves 18 extending in the general plane of the spokes to form when assembled a mechanical interlock against lateral displacement from the plane of the spider. The spokes are additionally secured to each other by welding in the mechanically interlocked area as indicated at 19. This may advantageously be a spot weld.

The spokes may be of substantially uniform thickness throughout but are advantageously so formed as to taper slightly towards their outer ends. They may also taper laterally from a median line or have rounded edges. For the purpose of affording additional strength and also for ventilating purposes as later explained, the spokes are longitudinally depressed to form on one side a valley 20 and upon the other side a corresponding ridge 21, the width of the valley and ridge tapering longitudinally with the spoke width towards the outer end of the spoke and the depth and height respectively of the valley and ridge may also diminish longitudinally towards the outer end.

At their outer ends the spokes are laterally flanged and provided with tongues 22 taking into corresponding holes provided in the base of fixed rim 23 and upset therein to form a mechanical interlock therewith, the metal of the spokes and fixed rim being spot welded in the interlocked area as indicated at 24.

Referring now to Figs. 6 and 7 of the drawing, we have the fixed rim 23 provided with inwardly projecting tongues 25 forming lateral abutments for the flanged ends 26 of the spokes 11, the flanges 26 lying against the inner face of the fixed rim between the tongues 25 and spot welded as indicated at 24 in the interlocked area bounded by the tongues 25.

In Fig. 8 the longitudinally depressed portion of the spoke by which a valley is formed upon one side and a ridge 27 upon the other, is bounded by substantially straight lines; whereas in Fig. 9 the same area presenting on one side a valley and on the other a ridge 28, is bounded in its outer extent by substantially straight lines and at its inner extent by a substantially circular line. The manner of assembly at the hub and at the rim is that illustrated in Figs. 1 to 5 inclusive.

It will be observed that the swell or ridge formed on the spokes terminates a substantial distance from the inner end thereof to provide an annular space about the outer edge of the clamping ring 16, which space is available for the application of a spring or pressure pad in the act of welding.

In Fig. 10 is illustrated a spoke connection with a fixed rim substantially that illustrated in and described with reference to Figs. 1 to 5 inclusive, the tongue 22 of the spoke end taking into a hole formed in the fixed rim 29 and spot welded at 30 in the interlocked area. This figure illustrates the adaptation of the fixed rim to receive a demountable rim 31, the fixed rim 29 differing only from the fixed rim 23 in that the tire-retaining flange and the locking ring flange are omitted. The demountable rim 31 is shown as supported at the rear by the fixed rim flange 32 and at the front by a rim-retaining ring or clip 33 clamped to the spoke by means of the bolt 34.

In Fig. 11 is shown a cross sectional detail of a slightly modified form of spoke contour, wherein the longitudinally extending valley and ridge diminish as to depth and height not only towards the outer end of the spoke but laterally towards the leading edge 11ª of the spoke whereby is obtained a turbine effect as the spoke moves rapidly through the air producing air current as indicated in said figure which act to ventilate and thus cool the brake drum 35 or other adjacent portions of the car mechanism as by a fanning action.

I claim:

1. In a vehicle wheel, the combination with a fixed rim, of a wheel spider comprising a radiant series of spokes connected at their inner ends, the outer ends of the spokes laterally flanged and provided with tongues taking into recesses provided in the fixed rim to form a mechanical interlock, the metal of the spokes and rim welded in the interlocked area.

2. In a vehicle wheel, the combination of a fixed rim, of a wheel spider comprising a radiant series of spokes connected at their inner ends, the outer ends of the spokes laterally flanged and provided with tongues taking into apertures provided in the rim base and upset therein to form a mechanical interlock, the metal of the spokes and rim spot welded in the interlocked area.

3. In a vehicle wheel, the combination of a fixed rim, of a wheel spider comprising a radiant series of spokes connected at their inner ends, the outer ends of the spokes laterally flanged, the flanges provided with angularly extending tongues taking into apertures provided in the rim base and upset therein to form a mechanical interlock, the metal of the spoke flanges and rim spot welded in the interlocked area.

In testimony whereof I have hereunto subscribed my name.

WILLIAM ERASTUS WILLIAMS.